Figure 1:
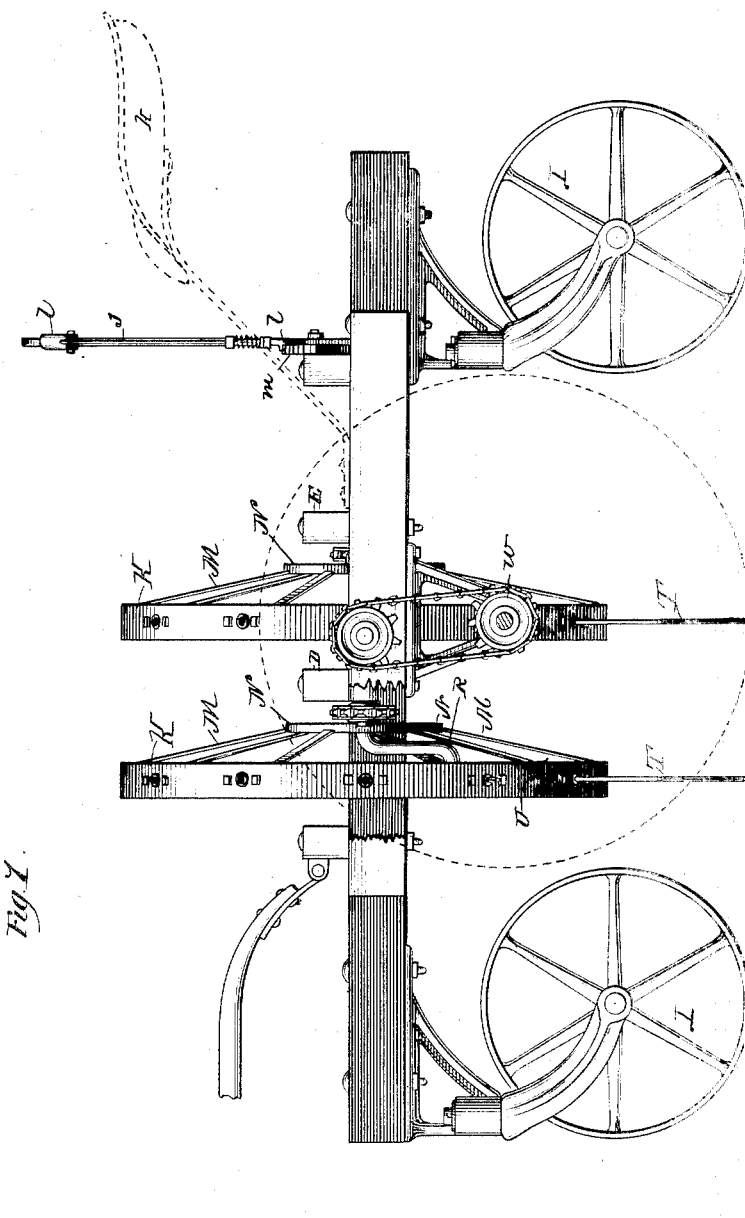

(No Model.)

M. BECK.
SIDE DELIVERY RAKE.

No. 468,382. Patented Feb. 9, 1892.

Witnesses:
Wm. M. Rheem
E. C. Wurdeman

Inventor:
Marshall Beck
By Elliott & Onshunder
Attorneys (No Model.)  5 Sheets—Sheet 2.
M. BECK.
SIDE DELIVERY RAKE.
No. 468,382.  Patented Feb. 9, 1892.
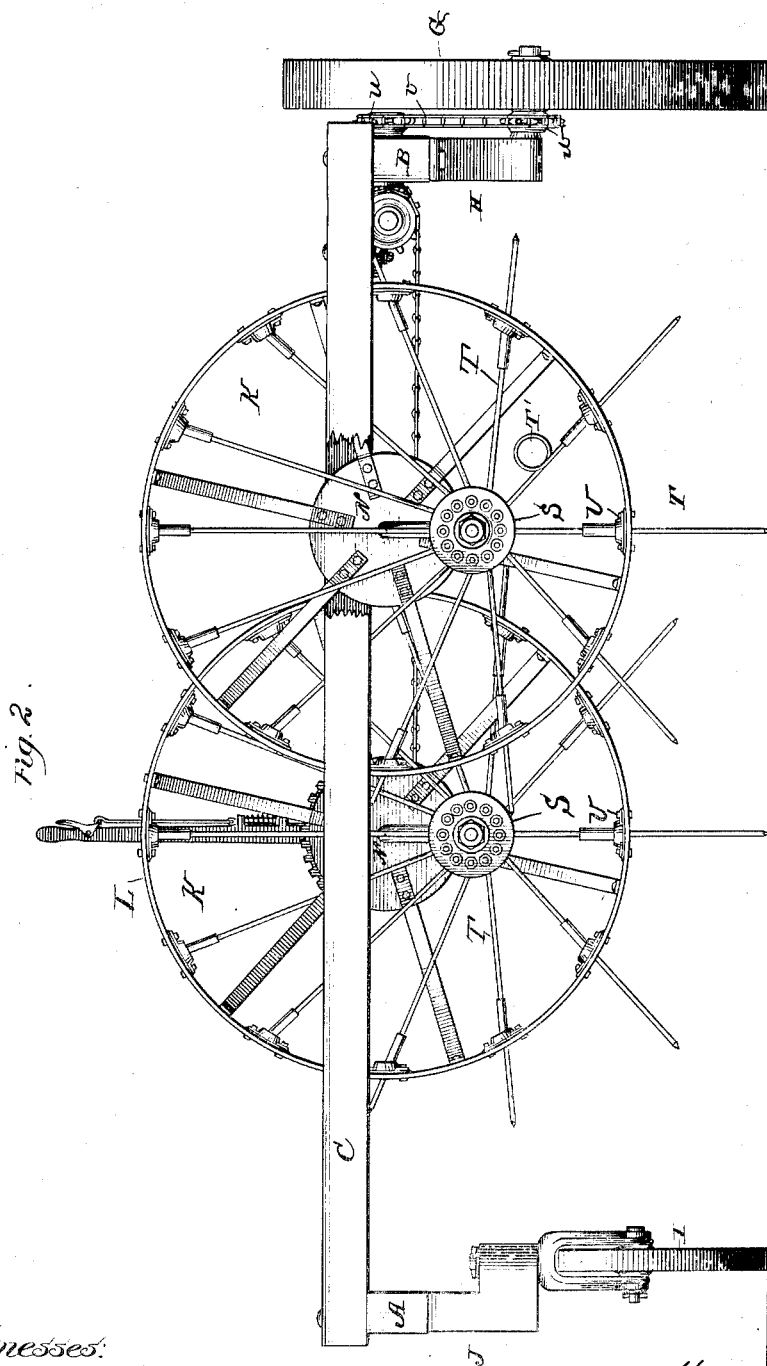
Witnesses:
Wm. M. Rheem
E. Wurdeman
Inventor:
Marshall Beck
By Elliott & Onthunds
Attorneys.

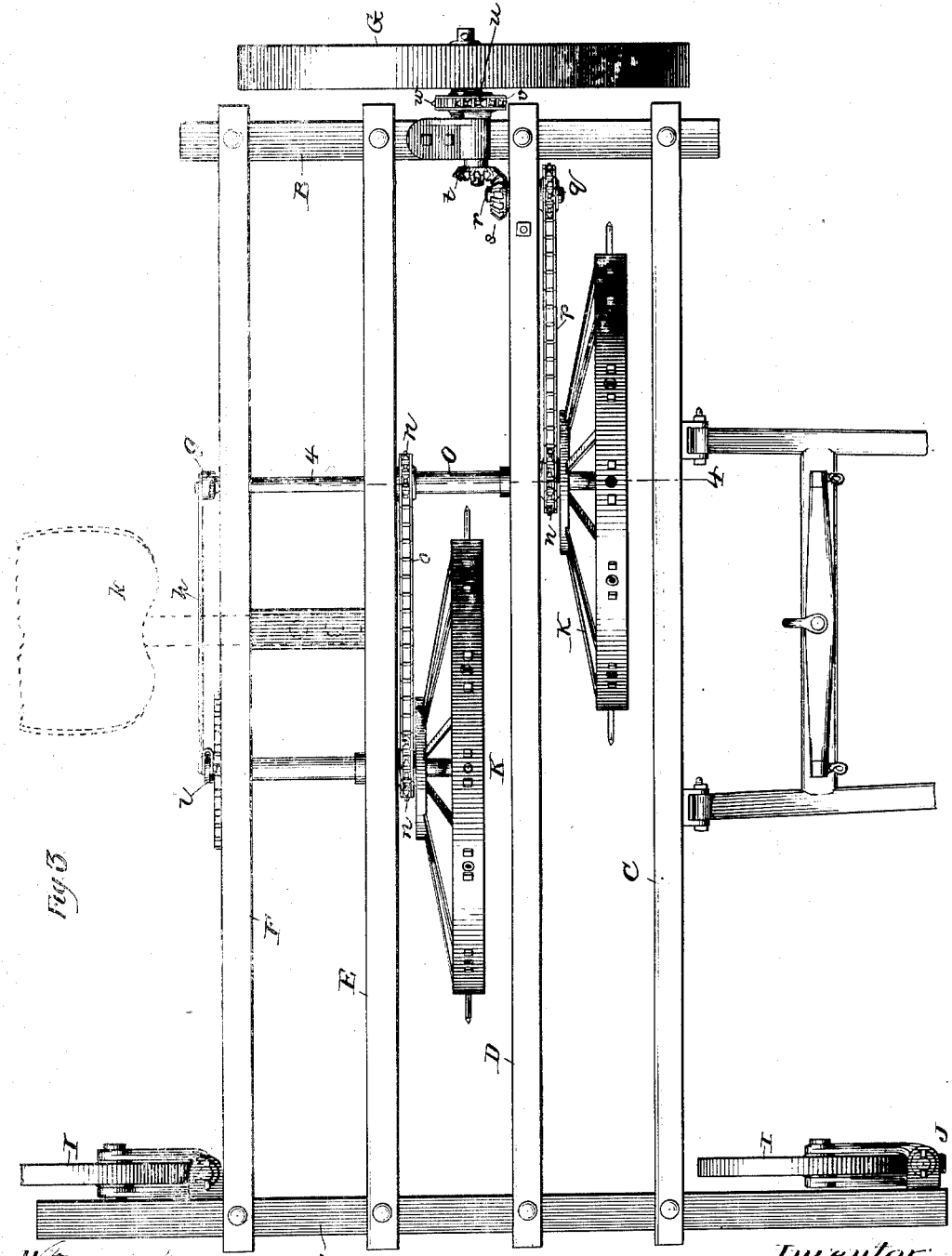

(No Model.) 5 Sheets—Sheet 4.
M. BECK.
SIDE DELIVERY RAKE.
No. 468,382. Patented Feb. 9, 1892.
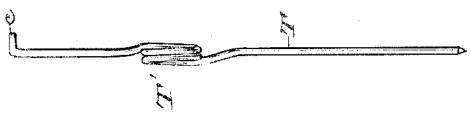
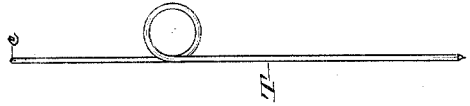
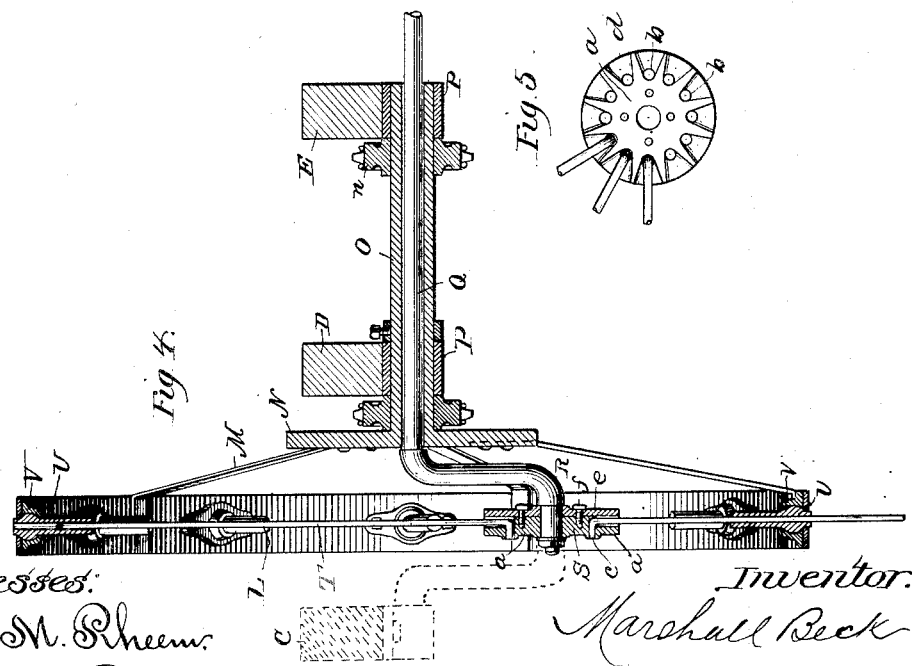
Witnesses:
Wm. M. Rheem.
E. C. Hurdeman
Inventor.
Marshall Beck
By Elliott & Omohundro
Attorneys.

(No Model.) 5 Sheets—Sheet 5.
M. BECK.
SIDE DELIVERY RAKE.
No. 468,382. Patented Feb. 9, 1892.
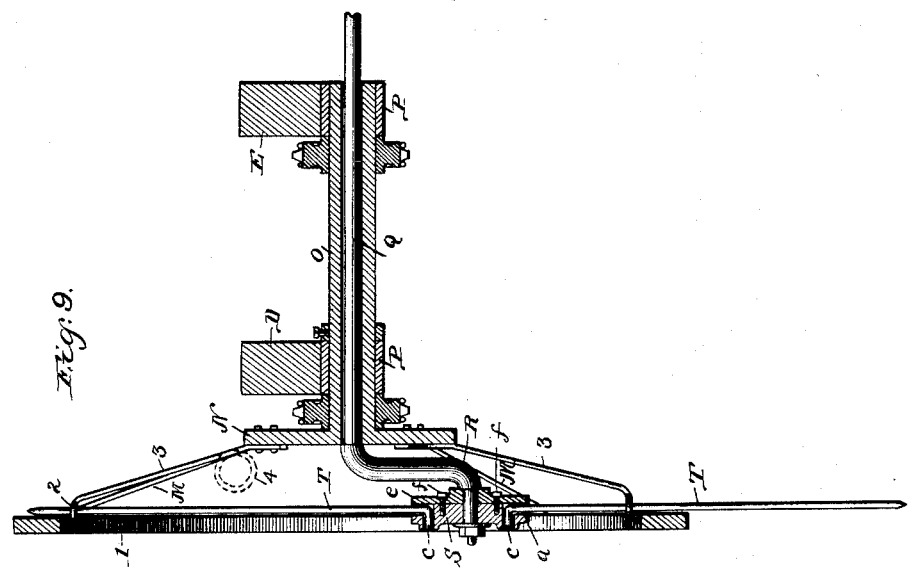
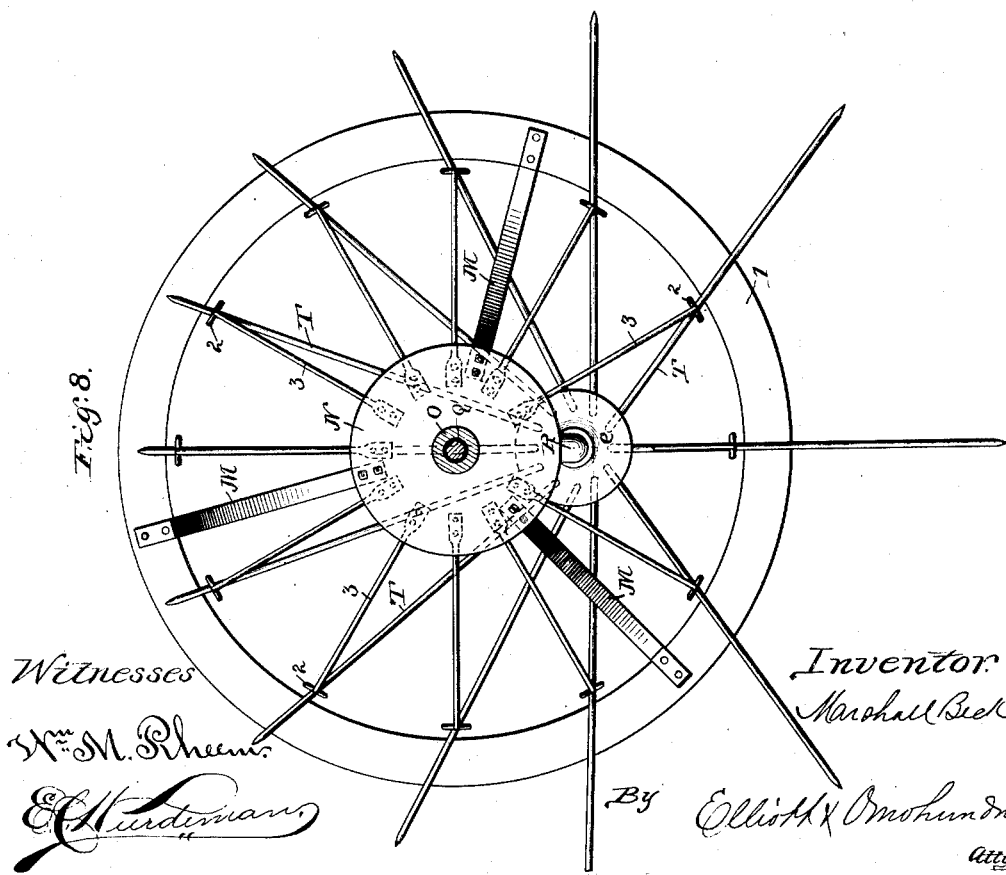
Witnesses
Wm. M. Rheem
E. C. Wurdeman
Inventor
Marshall Beck
By Elliott & Omohundro
Atty's

UNITED STATES PATENT OFFICE.

MARSHALL BECK, OF CHICAGO, ILLINOIS, ASSIGNOR, BY DIRECT AND MESNE ASSIGNMENTS, OF TWO-THIRDS TO JACOB W. SKINKLE AND DAVID K. HILL, OF SAME PLACE.

SIDE-DELIVERY RAKE.

SPECIFICATION forming part of Letters Patent No. 468,382, dated February 9, 1892.

Application filed March 21, 1890. Serial No. 344,694. (No model.)

*To all whom it may concern:*

Be it known that I, MARSHALL BECK, a citizen of the United States, and a resident of Chicago, in the county of Cook and State of Illinois, have invented certain new and useful Improvements in Side-Delivery Rakes, of which the following is a specification.

This invention relates to improvements in that class of horse hay-rakes known as "side-delivery rakes," in which the hay is delivered to one side of the machine, so as to form a windrow parallel with the path of travel of the machine.

The prime object of this invention is to have the rake automatically gather the hay, carry it sidewise, and discharge it beyond the path of the rake, whereby will be formed a continuous windrow to one side of and parallel with the path of travel of the machine.

Another object is to have a series of rake-teeth revolving about a common center and at right angles to the path of travel of the machine, to the end that the outer or raking points of the teeth shall pass over the ground in endless succession and that the gathering and side delivery of the hay shall be complete and continuous.

A further object is to have a series of such rotary rakes carried on a single machine and operating in unison, to the end that the hay gathered by each rake will be automatically delivered or transferred into the path of the next and each succeeding rake, whereby the hay may be deposited in a windrow at any suitable point within or beyond the carrying or ground wheel of the rake and the capacity of the machine or breadth of swath operated upon may be correspondingly increased.

A still further object is to have the rake of such character that the teeth of each rake may be rendered inoperative independently of or separately from those of the other rakes, or the teeth of all the rakes may be rendered simultaneously inoperative and without interfering with the continuous advance or operation of the machine, whereby the machine may pass over obstructions without the rake-teeth engaging the same and without stopping or interrupting the operation of the machine, and, finally, to provide certain novel details of construction in the carrying out of my invention for attaining these important results, all as illustrated in the accompanying drawings, in which—

Figure 1 represents a side elevation of a side-delivery rake embodying my invention with the near ground or drive wheel removed; Fig. 2, a front elevation thereof; Fig. 3, a top plan view; Fig. 4, an enlarged vertical section through one of the rakes, taken on the line 4 4 of Fig. 3; Fig. 5, a detail face view of one section of the pivoting-plate to which the rake-teeth are secured; Figs. 6 and 7, detail views of the rake-teeth; Fig. 8, a sectional rear elevation of a modified form of rake, and Fig. 9 a central vertical section thereof.

Similar letters and numerals of reference indicate the same parts in the several figures of the drawings.

The frame upon which the operative parts of my rake are supported may be constructed in any desirable manner and of any suitable dimensions, a simple construction being illustrated in the drawings, in which the frame is shown as consisting of two side timbers A B, connected by parallel cross-timbers C, D, E, and F, and supported at one side upon a single large ground or drive wheel G, working on a stud-axle cast with or otherwise rigidly secured to a bracket H, secured to the timber B, and at the opposite side upon caster-wheels I, pivotally connected with suitable brackets J, secured to the timber A, these wheels forming a triangular support for the frame. Upon this frame is suitably mounted any desirable number of rotary rakes K, arranged in series and each one to the rear and to one side of the rake next in advance, so as to operate successively upon the hay, and as these rakes are identical in construction I will describe only one of them in detail.

Let L represent a reel supported by the spokes M, which are set obliquely thereto and secured to a disk-like hub N to one side of and out of line with the reel, as more clearly illustrated in Fig. 4, which hub is provided with an elongated hollow sleeve O, journaled in suitable bearings P, secured to the cross-bars of the frame or any other suitable stationary portion thereof, according to the construction of the machine. Through this hub and sleeve loosely extends a crank-rod Q, the forward end or crank portion R of which projects and terminates within the reel L in a plane therewith and has loosely and detachably mounted thereon a perforated disk or tooth-plate S, to which are pivotally secured the inner ends of the rake-teeth T, the outer ends of which work loosely through suitable guide sleeves or thimbles U, having a ball-and-socket connection with the reel by means of socket-plates V, by which they are secured to the reel, the outer ends thereof projecting slightly through the reel, so that the teeth may project any desired distance beyond the periphery of the reel working and guided in the sleeves.

In practice the teeth might be connected directly with the crank R; but the tooth-plate is preferably employed, because by it all the teeth are brought into perfect alignment and the wear of the parts is considerably reduced. This plate preferably consists of two parts, a main body portion $a$, provided with an annular series of perforations $b$, through which project the bent or angular ends $c$ of the teeth, so as to have a pivotal connection therewith, the body of the teeth lying and working in suitable recesses or depressions $d$, formed in the plate adjacent to the perforations and extending to the periphery of the plate, so as permit of a limited freedom of movement of the plate and teeth relative to each other.

The teeth are held in position in their sockets by means of a cap or covering plate $e$, forming the other section of the tooth-plate and secured thereto by bolts $f$ or in any other convenient manner.

If desired, for the better support of the tooth-plate the crank-rod may be extended, as shown by dotted lines in Fig. 4, and the forward end thereof given a bearing in the frame concentric with the axis of the main or body portion of the rod. Thus it will be seen that the axis of rotation of the plate from which the teeth radiate is eccentric to the axis of the reel, which latter, through the medium of the elongated hub, as will be hereinafter more fully explained, is caused to revolve, carrying with it the teeth, which are thereby caused to automatically project beyond and withdraw within the periphery of the reel during the rotation thereof, projecting beyond the periphery farthest at the point at which their axis of rotation is nearest the reel and gradually lessening in the degree of projection in each direction therefrom. The teeth, as before stated, are guided in their movements by the sleeves or thimbles U, which, by reason of their ball-and-socket connection with the reel, will assume any desired angle during the rotation of the reel while guiding the teeth in their reciprocations, and, being of sufficient length to project some distance within the periphery of the reel, enables the withdrawal of the teeth entirely within the reel, and consequently a greater projection of the teeth beyond the reel when they arrive at the opposite side.

From the foregoing it will be understood that the teeth of the rake project beyond the reel much the same as would spokes, except that each tooth during its rotation about the axis of the reel is gradually moved outwardly, so as to project beyond the reel at one side, and as gradually moved inwardly, so that when it reaches the opposite point in its rotary travel it will be entirely within the periphery of the reel, which action causes each tooth of the rake to enter the hay slightly in advance of the next tooth to the rear and to withdraw from engagement with the hay also slightly in advance of the next tooth, thereby producing a successive action of the teeth in engaging and releasing the hay, which causes them to co-operate with each other in a manner advantageous in the maximum degree, the reel serving to strip the hay from the teeth in the act of withdrawal.

As before described, the radial position of the crank portion of the rod Q, from which crank portion the rake-teeth radiate, with relation to the axis of the reel, which latter causes said teeth to revolve about the axis of the crank portion, determines the point in the revolution of the wheel at which there will be the greatest projection and retraction of the teeth. Thus if the axis of the crank portion be in a vertical plane immediately below the axis of the reel, as illustrated more clearly in Figs. 2 and 4 of the drawings, the greatest projection of the tooth will be on a radial line passing through these axes below the reel, while upon the same line at the top of the reel the rake-teeth will not project at all beyond the reel, the intermediate teeth projecting in gradually-lessening degrees from the bottom to the top of the reel at each side of the center, and hence if the radial position of the axis of the rake-teeth relative to the axis of the reel be changed there will be a corresponding change in the point of the reel at which the greatest and least projection of the teeth occurs—that is to say, if the axis of the rake-teeth was moved to a point immediately above the axis of the reel the position of all the teeth would be exactly the reverse of that shown, for the teeth would then project from the upper half of the reel instead of the lower, as shown, or if moved a quarter around the axis of the reel, either to the right or left, there would be a corresponding projection of the teeth upon that side of the reel. To place this action of the teeth entirely within the control of the operator, so that they may be quickly rendered inoperative and withdrawn, so as to ride over any stump or other obstruction upon the ground, I extend the main body portion of the crank-rod Q a suitable distance to the rear of the machine, and then secure thereto a crank-arm $g$, which is connected by a rod $h$ with a corresponding crank-arm $i$ upon the next rake, one of which crank-arms—say the latter—is extended so as to form a handle-lever *j* in convenient proximity to the driver's seat *k* and provided with the usual spring-latch *l* and segment-rack *m* for locking the lever in any desired position, so that the driver may quickly and simultaneously change the radial position of the axis of the rake-teeth with relation to the axes of the reels by rotating the crank-rods in the manner before described. If more than two rake-reels are employed, the crank-rods of each may be connected with the adjacent rod, as just described, and all of them being thus connected in a gang they can be simultaneously operated by the driver with a single lever, or they may be operated separately by simply dispensing with the connecting-rods *h* and duplicating the hand-lever and lock for each crank-arm.

Power may be communicated to the rake-reels in any well-known and convenient manner, but preferably by means of sprocket-wheels *n*, mounted upon the hub-sleeves O, over which works a spocket-chain *p*, connecting the end wheel with a sprocket-wheel *q*, mounted upon one end of a short shaft *r*, journaled in the frame of the machine, upon the opposite end of which is mounted a beveled pinion *s*, meshing with a corresponding beveled pinion *t* upon another short shaft journaled upon the frame of the machine at right angles to the shaft *r* and carrying a sprocket-wheel *u*, upon the opposite end thereof, driven by a sprocket-chain *v*, working over another sprocket-wheel *w*, secured to the axle of the ground-wheel G. Thus it will be seen that the rotation of this ground or drive wheel during the forward travel of the machine will cause a like rotation of all of the rake-reels at any desired speed, which latter may be easily regulated by the relative proportions of the connecting-gears, and it will also be readily understood that any suitable and well-known form of clutch mechanism may be employed for controlling the operation of any one or all of the rakes by shifting them into and out of gear.

In practice it is desirable that the rake-teeth should be as flexible as possible, because of their action or revolution at right angles to their line of travel with the machine, in order that they may yield to the usual projections and unevenness of the ground without the necessity for being thrown out of operative position, because they will have more or less of a drag along the ground, according to the angle or obliqueness of their travel due to the compound action of their forward travel with the machine and their revolution in a plane at right angles to such travel producing a greater or less obliquity in the sidewise movement of the teeth. To this end the flexibility of that portion of the teeth which projects beyond the reel may be alone depended upon or the teeth between the reel and their pivoted end may have a coil or loop T' formed therein for greater flexibility, the reel in this case acting as the fulcrum for the teeth; but the same results may be accomplished in numerous other ways obvious to one skilled in the art to which my invention appertains. For instance, in Figs. 8 and 9 I have shown a modified construction of rake especially designed for attaining the desirable end of sufficient flexibility of the rake-teeth, and while the construction thereof differs materially in detail from the construction before referred to the operation thereof is identical with that of the rake already described and involves the same invention. In this case the reel 1 has the form of an annulus or ring and is employed for the sole purpose of guarding and stripping the teeth, being supported from the hub N upon the radial spokes M in the same manner as the reel of the construction previously described. The teeth T, however, instead of working through and being guided and carried by the reel, work upon the rear face thereof and are guided, operated, and carried about their axis of revolution by eyes 2, formed on the end of flexible arms 3, rigidly secured at their inner ends to the hub N, in which arms, if desirable, a loop or coil 4 may be formed for promoting their effectiveness. Thus it will be seen that, while the arms 3 guide and carry the teeth or fingers about their axis of revolution in the same manner as the reel before described, the flexibility of the arm leaves the teeth practically free to bend backward from their point of attachment to the pivoting-plate, carrying with them the arms, thus giving the teeth sufficient flexibility for all desired purposes.

I may here state that it is not essential to the successful operation of my invention that more than one rotary rake be employed, for each rake is in itself practically a complete machine; but in practice the employment of a series of any desirable number of rakes is of great advantage, for with the rakes so placed with relation to each other—that is to say, each one slightly to the rear and to one side of the next in advance—the hay gathered by each is discharged or deposited upon the ground in front of the next reel toward the delivery side of the machine, except the last, which makes the final delivery of the hay thus accumulated and leaves it in a continuous windrow lying parallel with and to one side of the path of travel of the machine.

As to the relation or location of the rakes relative to each other, the second rake and each succeeding rake should be set to one side of and sufficiently to the rear of the rake preceding it not to interrupt or impede such preceding reel in the free discharge of its quota of hay into the path of such succeding rake; but the degree of lateral or longitudinal separation of the rakes is not arbitrary.

The principal advantage of my invention is that, unlike the common rake with fixed rake-teeth, which are helpless to dispose of the hay gathered by them without manual or intermittent mechanical aid, my rake is positive and automatic in its operation and causes a continuous delivery of the hay, so as to form a windrow at one side of and parallel with the path of travel of the machine.

In conclusion it should be observed that the reel is a stripper for the teeth, and that for this purpose it need not be rotatable, but may be fixed, and so also the eccentric rotation of the teeth may be secured by a straight shaft eccentric to the axis of the reel, for in either construction the reel would serve as a stripper for the radial teeth revolving on an axis eccentric to the axis of center of the stripper.

Having described my invention, what I claim, and desire to secure by Letters Patent, is—

1. In a horse hay-rake, the combination, with a reel, of a series of radially-projecting rake-teeth revolving in a plane substantially at right angles to the path of travel of the machine, substantially as described.

2. In a horse hay-rake, the combination, with a rotary stripping-wheel, of a series of radial rake-teeth revolving in a plane parallel with the same, but at right angles to the path of travel of the machine, substantially as described.

3. In a horse hay-rake, the combination, with a stripping-reel rotating in a plane at right angles to the path of movement of the machine, of a series of radial rake-teeth revolving in a plane parallel with said reel, but about an axis eccentric to that of the reel, substantially as described.

4. In a horse hay-rake, the combination, with a stripping-reel rotating in a plane at right angles to the path of movement of the machine, of a series of radial rake-teeth revolving in a plane parallel with said reel, but about an axis eccentric to that of the reel, and means for changing the radial position of the axis of the teeth with relation to the axis of the reel, substantially as described.

5. In a horse hay-rake, the combination of a stripping-reel and two or more rotary rakes mounted eccentrically to their driving-shafts and operating in the same direction and in parallel planes at right angles to the path of travel of the machine, substantially as described.

6. In a horse hay-rake, the combination of a stripping-reel and two or more rotary rakes mounted eccentrically to their driving-shafts and operating in the same direction and in parallel planes at right angles to the path of travel of the machine, the axis of each rake being located to one side of the rake next in advance, whereby each rake discharges the hay gathered thereby to one side thereof and in front of the rake next in the rear, substantially as described.

7. In a horse hay-rake, the combination, with a stripping-reel rotating in a plane at right angles to the path of movement of the machine, of a crank-shaft the main portion of which has a common axis with the reel, and a series of radial rake-teeth pivotally secured to the crank portion of said shaft, revolving in unison with and in a plane parallel with said reel, substantially as described.

8. In a horse hay-rake, the combination, with a stripping-reel rotating in a plane at right angles to the path of movement of the machine, of a rotatable crank-shaft the main portion of which has a common axis with the reel, a series of radial rake-teeth pivotally secured to the crank portion of said shaft, revolving in unison with and in a plane parallel with said reel, and means for rotating said shaft, substantially as and for the purpose described.

9. In a horse hay-rake, the combination, with a stripping-reel rotating in a plane at right angles to the path of movement of the machine, of a crank-shaft the main portion of which has a common axis with the reel, a pivoting-plate loosely mounted upon the crank portion of said shaft, and a series of radial rake-teeth pivotally secured to said plate, revolving in unison with and in a plane parallel with said reel, substantially as described.

10. In a horse hay-rake, the combination of the rake-teeth, the reel, the thimbles, and ball-and-socket connections between said thimbles and the reel, substantially as described.

11. In a horse hay-rake, the combination, with the reel, of the rake-teeth, the thimbles, and a universal joint or connection between said thimbles and the reel, substantially as described.

MARSHALL BECK.

Witnesses:
R. C. OMOHUNDRO,
JNO. G. ELLIOTT.